(12) United States Patent
Lee

(10) Patent No.: US 8,723,398 B2
(45) Date of Patent: May 13, 2014

(54) PIEZOELECTRIC ENERGY HARVESTING APPARATUS

(75) Inventor: Sang Kyun Lee, Gwangju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 366 days.

(21) Appl. No.: 13/303,179

(22) Filed: Nov. 23, 2011

(65) Prior Publication Data

US 2012/0153773 A1    Jun. 21, 2012

(30) Foreign Application Priority Data

Dec. 17, 2010    (KR) .................... 10-2010-0129936

(51) Int. Cl.
*H02N 2/18*    (2006.01)
(52) U.S. Cl.
USPC ................... 310/319; 310/329; 310/339
(58) Field of Classification Search
CPC .............. H01L 41/1136; H01L 41/042; H01L 41/1132; H02N 2/18; F23Q 3/002; G01P 15/0907; G01P 15/0922; G01P 15/0915; G01L 1/16
USPC .......................... 310/319, 329, 339
See application file for complete search history.

(56) References Cited

U.S. PATENT DOCUMENTS 5,801,475 A * 9/1998 Kimura ................. 310/319
5,977,690 A * 11/1999 Ellis et al. ............. 310/330
2004/0212276 A1 10/2004 Brantner et al.
2008/0174273 A1 * 7/2008 Priya et al. ............ 320/114
2008/0252174 A1 * 10/2008 Mohammadi et al. ....... 310/319
2010/0072759 A1 3/2010 Andosca et al.
2011/0057547 A1 * 3/2011 Fain .................... 310/339

FOREIGN PATENT DOCUMENTS

JP    2007-173456 A    7/2007
KR   2010-0099014 A    9/2010

OTHER PUBLICATIONS

Jing-Quan Liu at al., "A MEMS-Based Piezoelectric Power Generator Array for Vibration Energy Harvesting", Microelectronics Journal, vol. 39, pp. 802-806, Feb. 20, 2008.

* cited by examiner

*Primary Examiner* — Derek Rosenau
*Assistant Examiner* — Bryan Gordon
(74) *Attorney, Agent, or Firm* — Rabin & Berdo, P.C.

(57) ABSTRACT

Disclosed is a piezoelectric energy harvesting apparatus. The piezoelectric energy harvesting apparatus includes: a piezoelectric energy harvesting array that includes a plurality of piezoelectric energy harvesting devices converting an external vibration into electric energy; a plurality of switches that is connected in series to the piezoelectric energy harvesting devices, respectively, and fits the resonance frequency of the piezoelectric energy harvesting array to the frequency of the external vibration by adjusting the resonance frequencies of the piezoelectric energy harvesting devices through the operation of the switches; and at least one or more rectifiers that convert alternating voltage outputted from the piezoelectric energy harvesting array into direct voltage.

7 Claims, 5 Drawing Sheets

PIEZOELECTRIC ENERGY HARVESTING APPARATUS

CROSS-REFERENCE TO RELATED APPLICATIONS

This application is based on and claims priority from Korean Patent Application No. 10-2010-0129936, filed on Dec. 17, 2010, with the Korean Intellectual Property Office, the disclosure of which is incorporated herein in its entirety by reference.

TECHNICAL FIELD

The present disclosure relates to a piezoelectric energy harvesting apparatus, and more particularly, to a piezoelectric energy harvesting apparatus that can improve output by fitting the resonance frequency of a piezoelectric energy harvesting array to the frequency of an environmental vibration.

BACKGROUND

A piezoelectric energy harvesting device (hereafter, referred to as a "PEH device") generates the largest electric energy at the resonance frequency, with amplification of the displacement, when the frequency of the environmental vibration and the resonance frequency of the PEH device agree with each other.

The voltage generated by the PEH device is outputted in the AC (Alternating Current) type. A rectifier is used to convert the AC voltage into the DC voltage. The rectifier is composed of four or two diodes, in a full-bridge or half-bridge type. A capacitor for reducing ripple of the DC voltage is connected to the rear end of the rectifier.

The DC voltage, is used to charge another supercapacitor or a battery, or activate an IC etc. Electric energy that is obtained from small vibrations generated in the peripheral environment is, however, not sufficient as power for activating an IC because the magnitudes are too small. Therefore, a method of increasing output by optimizing the size or the shape of the PEH device or using a multilayer has been researched.

A piezoelectric ceramic device has a brittle property, such that it is vulnerable to shock etc. and is limited in increasing the size of the device. Using the multilayer is not suitable for manufacturing the PEH device, because the manufacturing processes are not yet established. As another method of increasing the output of the PEH device, there is a method using single crystals having high coupling efficiency and a large piezoelectric constant, which requires very difficult process for manufacture a multilayer.

As a method for solving the problems, a method of improving output, using piezoelectric energy harvesting arrays (hereafter, referred to as 'PEH arrays') can be proposed. A method that uses a tip mass at the end of a cantilever after optimizing the shape or the size of a single PEH device itself is generally used to fit the resonance frequency of the PEH device to the frequency of an environmental vibration (for example, 1 to 120 Hz).

Meanwhile, two frequencies exist, when the PEH device is manufactured by a piezoelectric material. One is the resonance frequency in a short-circuit state in which resistance R (connected to PEH device) goes to 0 (hereafter, referred to as 'sc resonance frequency') and the impedance is the smallest, and the other one is the resonance frequency in an open circuit state, in which the resistance R goes to $\infty$ (hereafter, referred to as 'oc resonance frequency') and the impedance is the largest. R is a resistor connected to the end of the PEH device. The resonance frequencies are determined by an effective electro-mechanical coupling constant. In general, the piezoelectric ceramic is small for effective electro-mechanical coupling constant and a piezoelectric single crystal has a large value close to 1.0 (efficiency of converting mechanical energy into electric energy=100%).

In order to measure the basic output characteristic of the PEH device, a resistor R is connected to the end of the PEH device, with a low vibration applied, and the current flowing through the connected resistor R is measured, or the voltages at both ends of the resistor are measured. Since the frequency where the maximum output is generated changes between the sc resonance frequency and the oc resonance frequency, in accordance with the value of the resistor R, the resonance frequency of the single PEH device can be easily measured.

However, since the sc resonance frequency and the oc resonance frequency of the PEH array depend on the mechanical state as well as the electric connection states, the electric properties of the PEH array are measured, with the resonance frequency of the single PEH device made fit the frequency of the environmental vibration, after the PEH array is manufactured. In this case, a desired output cannot be achieved due to output saturation, even if the number of PEH devices is increased.

SUMMARY

The present disclosure has been made in an effort to provide a piezoelectric energy harvesting apparatus that can reduce an electric loss by fitting the resonance frequency of a piezoelectric energy harvesting array to the frequency of an environmental vibration, increase the output current by generating output electricity that is proportionate to an increase in the number of piezoelectric energy harvesting devices, and rapidly charge a supercapacitor or a battery.

An exemplary embodiment of the present disclosure provides a piezoelectric energy harvesting apparatus including: a piezoelectric energy harvesting array that includes a plurality of piezoelectric energy harvesting devices converting an external vibration into electric energy; a plurality of switches that are connected in series to the piezoelectric energy harvesting devices, respectively, and fit the resonance frequency of the piezoelectric energy harvesting array to the frequency of the external vibration by adjusting the resonance frequencies of the piezoelectric energy harvesting devices through the operation of the switches; and at least one or more rectifiers that convert alternating voltage outputted from the piezoelectric energy harvesting array into direct voltage.

According to the exemplary embodiment of the present disclosure, it is possible to achieve output power/current that is in proportion to the number of piezoelectric energy harvesting devices, without causing saturation of output power/current and rapidly charge a supercapacitor or a battery, by providing a piezoelectric energy harvesting apparatus that can fit the resonance frequency of a piezoelectric energy harvesting array to the frequency of an environmental vibration.

Further, the piezoelectric energy harvesting apparatus according to the exemplary embodiment of the present disclosure can be used in the devices constituting a wireless sensor network, which is require to be charged by themselves due to high output, as power suppliers.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
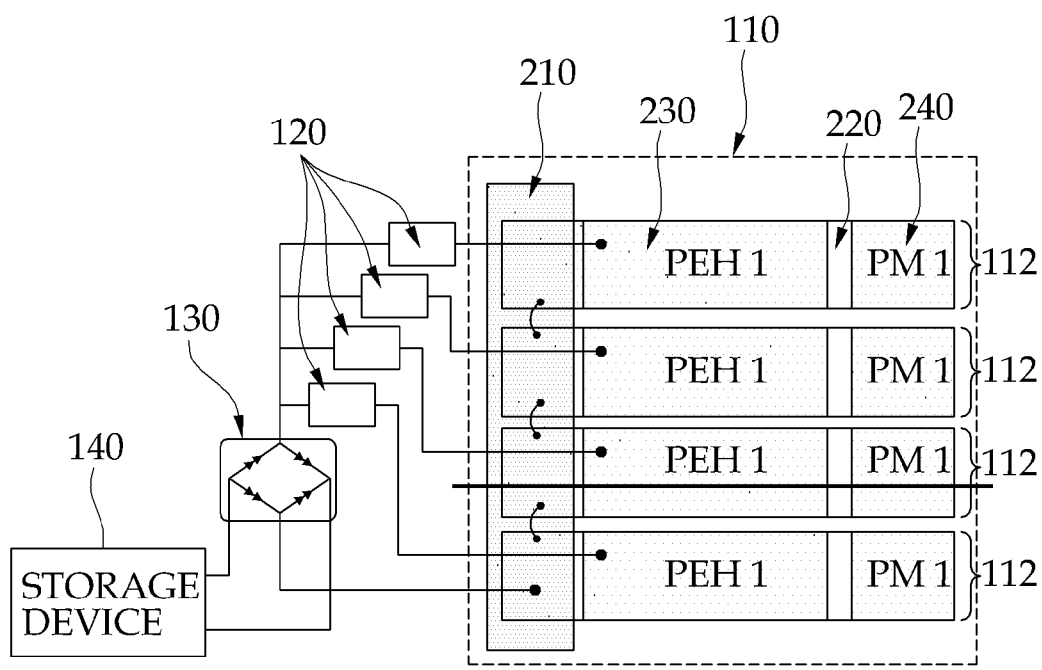
FIG. 1 is a block configuration diagram showing the configuration of a piezoelectric energy harvesting apparatus according to an exemplary embodiment of the present disclosure.

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, exemplary embodiments of the present disclosure will be described in detail with reference to the accompanying drawings. Further, in describing the present disclosure, well-known functions or constructions will not be described in detail since they may unnecessarily obscure the understanding of the present disclosure.

In general, piezoelectric energy harvesting devices (hereafter, referred to as 'PEH devices') are classified into a piezoelectric monomorph composed of a single piezoelectric layer that generates electric output and a non-piezoelectric layer that reinforces the brittle characteristic of the piezoelectric layer and a piezoelectric bimorph in which piezoelectric layers are stacked at both sides of the non-piezoelectric layer. Further, there is a multilayer PEH device in which several layers are stacked, instead of two piezoelectric layers.

Hereinafter, the characteristics of a PEH device is described by exemplifying a piezoelectric bimorph.

In the piezoelectric bimorph, two piezoelectric layers can be connected in series or in parallel, depending on the polarization direction of two piezoelectric layers. In the parallel connection, the output current is high, while in the series connection, the output voltage is high. In both cases, the output power is not influenced by the shape of the wire connection. The optimum resistance that generates the maximum output power is influenced by the connection status of wires, and accordingly, the resonance frequency of the PET device changes. Since the optimum resistance that generates the maximum power output is larger in the series connection than the parallel connection, the output voltage and the output current are produced inversely proportionate. That is, the parallel connection has a low electric impedance, whereas the series connection shows high electric impedance.

Since a supercapacitor or a battery is considerably influenced by the magnitude of the current, they may be charged in the parallel connection with high output current.

The output power/current of the PEH device can be maximized by fitting the own frequency to the frequency of a peripheral vibration. This frequency is called the resonance frequency of the PEH device. In the piezoelectric device, the frequency measured with two wires connected (R→0) is called a resonance frequency in a short-circuit state (hereafter, referred to as 'sc resonance frequency) and the frequency measured with two wires opened (R→∞) is called a resonance frequency in an open-circuit state (hereafter, referred to as 'oc resonance frequency'). Similar to the wire connection of the piezoelectric bimorph, the PEH device outputs high current when vibrating at the sc resonance frequency, and outputs high voltage when vibrating at the oc resonance frequency. That is, when the PEH device is in the sc state, the maximum current is generated.

Further, electric energy obtained from small vibrations generated in the peripheral environment is too small in magnitude, such that it is insufficient for power for activating an IC, such that the output power can be increased by manufacturing piezoelectric energy harvesting arrays (hereafter, referred to as 'PEH array').

Since the sc resonance frequency and the oc resonance frequency of the PEH array depend on the mechanical state as well as the electric connection state, the electric properties of the PEH array are measured, with the resonance frequency of the single PEH device made fit the frequencies of the peripheral vibrations, after the PEH array is manufactured. In this case, a desired output cannot be achieved due to output saturation, even if the number of PEH devices is increased.

As a result, the mechanical properties of the PEH array, that is, displacement of the PEH array which is caused by a vibration decreases and the decreased displacement reduces the electric output. Further, with an increase in the number of the PEH devices, an effective capacitance increases in proportion to the number of the PEH devices due to the parallel connection of the capacitances that the piezoelectric materials have (that is, the piezoelectric materials can be shown by an electric parallel connection state of a current supply and a capacitance). A change in effective capacitance has an effect on the electric properties of the PEH array. This is in close connection with the effective electro-mechanical coupling constant of the piezoelectric device.

The resonance frequency of a piezoelectric device is divided by the effective electro-mechanical coupling constant. The sc and the oc resonance frequency of a piezoelectric device may be expressed by the following Formula 1.

[Formula 1]

$$\omega_{sc} = \sqrt{K_{eq}/M_{eq}}, \omega_{oc} = \omega_{sc} \cdot \sqrt{1+\kappa}$$

where Keq is mechanical effective stiffness of a piezoelectric device, Meq is effective mass, and κ is an effective electro-mechanical coupling constant.

A change in effective electro-mechanical coupling constant of a piezoelectric device has the largest effect on not only the frequency, but the electric output, such that output saturation is caused, even though the PEH array increases in the PEH arrays, even if electric output is generated at the resonance frequency in the PEH device.

In order to prevent the output saturation of the PEH array, it is required to change the resonance frequency by the effective electro-mechanical coupling constant of the PEH array, which can be obtained from the oc resonance frequency of individual PEH devices, in which the PEH array generates the maximum output.

Therefore, an exemplary embodiment of the present disclosure provides a piezoelectric energy harvesting apparatus that can fit the resonance frequency of the PEH array to the frequency of a peripheral vibration.

FIG. 1 is a block configuration diagram showing the configuration of a piezoelectric energy harvesting apparatus according to an exemplary embodiment of the present disclosure.

Referring to FIG. 1, a piezoelectric energy harvesting apparatus according to the exemplary embodiment of the present disclosure includes a PEH array 110, a plurality of switches 120, and a rectifier 130. Although a PEH array 110 includes four PEH devices 112 for the convenience of description in the exemplary embodiment of the present disclosure, PEH array 110 is not limited thereto and may include at least two or more PEH devices 112, if necessary.

PEH array 110 includes a plurality of PEH devices 112 that change an external vibration into electric energy. PEH devices 112 may include a vibration base 210, a metal core 220, a piezoelectric layer 230, and a tip mass 240 and the components of PEH device 112 are described in detail with reference to FIG. 2.

Switches 120 are connected in series to PEH devices 112, respectively, the resonance frequencies of PEH devices 112 are adjusted by operating the switches, such that resonance frequency of PEH array 110 is fitted to the frequency of an external vibration. In detail, the output voltage of PEH array 110 becomes the maximum, when all of switches 120 are turned on. Further, at least one or more switches in switches 120 may be turned off such that the output current of PEH array 110 is not saturated.

Rectifier 130 converts the alternating voltage outputted from PEH array 110 into direct voltage and stores the direct voltage in a storage device 140.

Figure 2:
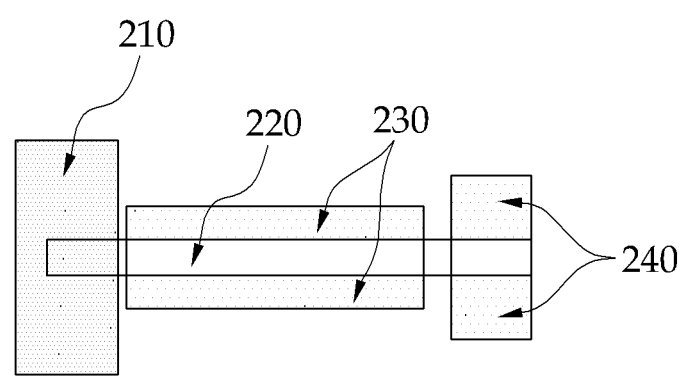
FIG. 2 is a cross-sectional view of a PEH device according to an exemplary embodiment of the present disclosure.

FIG. 2 is a cross-sectional view of a PEH device according to an exemplary embodiment of the present disclosure.

Referring to FIG. 2, PEH device 112 according to the exemplary embodiment of the present disclosure includes a vibration base 210, a metal core 220, a piezoelectric layer 230, and a tip mass 240.

Vibration base 210 functions as a fixing end for PEH device 112.

One end of metal core 220 is fixed to vibration base 210 and tip mass 240 is connected to the other end. In this configuration, a groove may be longitudinally formed on the top of metal core 220, as a structure for increasing the displacement of metal core 220.

Piezoelectric layer 230 may be formed on or under the metal core 220 and may include a PZT, a PMN-PT, a PZN-PT, a PMN-PZT, and a MFC (micro-fiber composite). Further, it is possible to prevent breaking due to physical stress by forming piezoelectric layer 230 apart from vibration base 210.

Tip mass 240 is a weight for applying vibration to PEH device 112 and connected to the other end of metal core 220. Weight of tip mass 240 may be changed to change the vibration frequency of PEH device 112.

Figure 3:
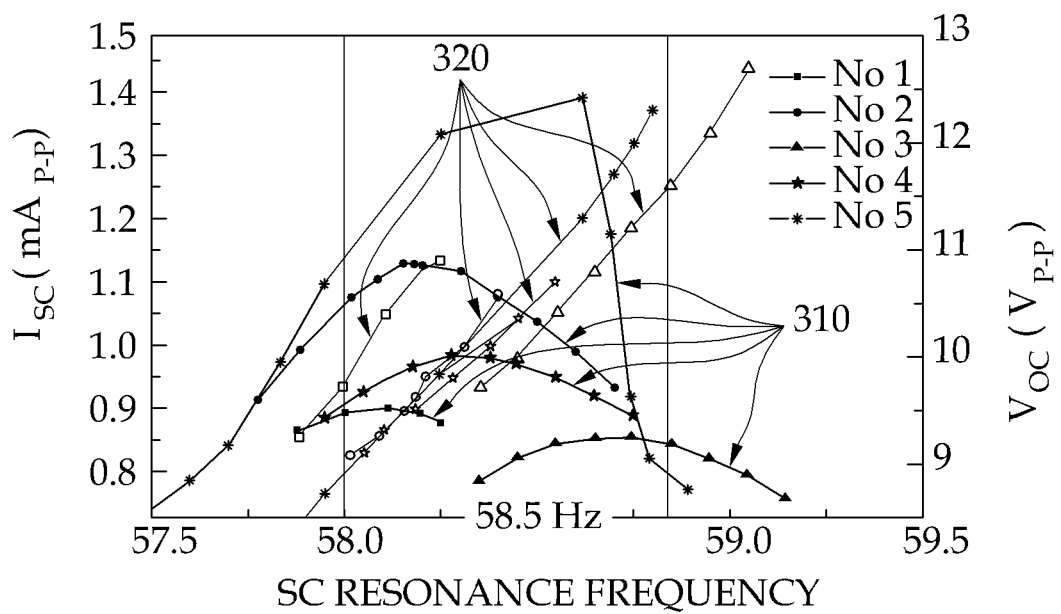
FIG. 3 is a graph showing output current/voltage at the sc resonance frequency of individual PEH devices.
Figure 4:
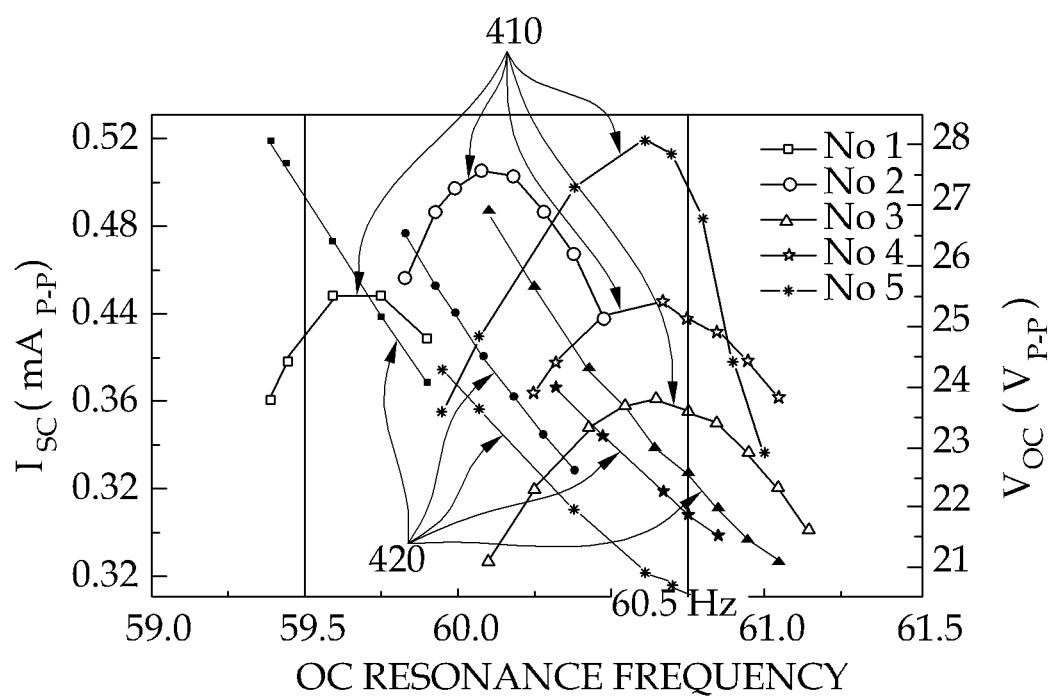
FIG. 4 is a graph showing output current/voltage at the oc resonance frequency of individual PEH devices.

FIG. 3 is a graph showing output current/voltage at the sc resonance frequency of individual PEH devices and FIG. 4 is a graph showing output current/voltage at the oc resonance frequency of individual PEH devices.

Referring to FIG. 3, '310' represents the output current of the PEH devices at the sc resonance frequency and '320' represents the output voltage of the PEH devices at the sc resonance frequency.

Referring to FIG. 4, '410' represents the output current of the PEH devices at the oc resonance frequency and '420' represents the output voltage of the PEH devices at the oc resonance frequency.

As shown in FIG. 3, the output current of the PEH devices becomes the maximum at the sc resonance frequency, and as shown in FIG. 4, the output voltage of the PEH devices becomes the maximum at the oc resonance frequency.

Figure 5:
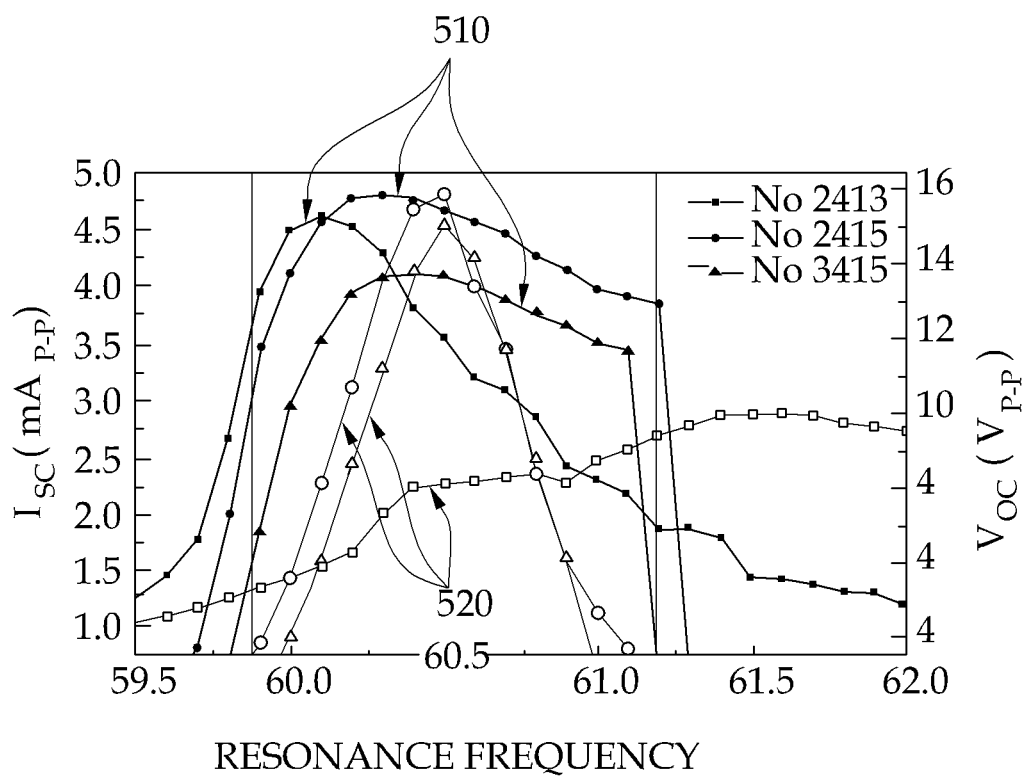
FIG. 5 is a graph showing output current/voltage at the resonance frequency of a PEH array according to an exemplary embodiment of the present disclosure.

FIG. 5 is a graph showing output current/voltage at the resonance frequency of a PEH array according to an exemplary embodiment of the present disclosure.

Referring to FIG. 5, '510' represents the output current of the PEH devices at the resonance frequency and '520' represents the output voltage of the PEH devices at the resonance frequency.

The existing PET arrays had a limit in increasing the output current due to output saturation, even though the number of PEH devices is increased.

However, as shown in FIG. 5, the PEH array according to the exemplary embodiment of the present disclosure does not causes output saturation, such that it can be seen that the output current increases in proportion to the number of PEH devices.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A piezoelectric energy harvesting apparatus, comprising:
   a piezoelectric energy harvesting array that includes a plurality of piezoelectric energy harvesting devices converting an external vibration into electric energy;
   a plurality of switches that is connected in series to the piezoelectric energy harvesting devices, respectively, and fits the resonance frequency of the piezoelectric energy harvesting array to the frequency of the external vibration by adjusting the resonance frequencies of the piezoelectric energy harvesting devices through the operation of the switches; and
   at least one or more rectifiers that convert alternating voltage outputted from the piezoelectric energy harvesting array into direct voltage.

2. The apparatus of claim 1, wherein the output voltage of the piezoelectric energy harvesting array becomes the maximum, when all of the switches are turned on.

3. The apparatus of claim 1, wherein at least one or more of the switches are turned off such that the output current of the piezoelectric energy harvesting array is not saturated.

4. The apparatus of claim 1, wherein the piezoelectric energy harvesting devices each include:
   a vibration base that functions as a fixing end;
   a metal core with one end connected to the vibration base;
   a piezoelectric layer that is formed on or under the metal core; and
   a tip mass that is connected to the other end of the metal core.

5. The apparatus of claim 4, wherein the vibration base and the piezoelectric layer are spaced.

6. The apparatus of claim 4, wherein the piezoelectric layer includes at least one of a PZT, a PMN-PT, a PZN-PT, a PMN-PZT, and an MFC (micro-fiber composite).

7. The apparatus of claim 4, wherein a groove is longitudinally formed on the top of the metal core.

* * * * *